United States Patent [19]
Aoki et al.

[11] Patent Number: 5,717,271
[45] Date of Patent: Feb. 10, 1998

[54] BRUSH HOLDER DEVICE AND METHOD OF MOLDING SAME

[75] Inventors: Susumu Aoki, Kiryu; Hideki Furuuchi, Isesaki; Akihito Miyamoto, Kiryu, all of Japan

[73] Assignee: Mitsuba Corporation, Gunma, Japan

[21] Appl. No.: 570,669

[22] Filed: Dec. 11, 1995

[30] Foreign Application Priority Data

| Jan. 27, 1995 | [JP] | Japan | 7-031497 |
| Jan. 27, 1995 | [JP] | Japan | 7-031498 |
| Oct. 2, 1995 | [JP] | Japan | 7-278319 |

[51] Int. Cl.$^6$ .................. H01R 39/38; H02K 13/00
[52] U.S. Cl. ............ 310/242; 310/239; 310/245; 310/246
[58] Field of Search .............. 310/239, 242, 310/245, 246

[56] References Cited

U.S. PATENT DOCUMENTS

| 3,654,504 | 4/1972 | Susdorf et al. | 310/239 |
| 3,842,302 | 10/1974 | Apostoleris | 310/239 |
| 3,955,113 | 5/1976 | Hillyer et al. | |
| 4,593,220 | 6/1986 | Cousins et al. | 310/239 |
| 5,053,665 | 10/1991 | Yamaguchi et al. | 310/239 |
| 5,148,073 | 9/1992 | Tamura | 310/239 |
| 5,159,221 | 10/1992 | Miyazaki et al. | |
| 5,283,494 | 2/1994 | Frank et al. | 310/239 |

FOREIGN PATENT DOCUMENTS

| 1 042 203 A | 10/1953 | France . |
| 2 315 790 A | 1/1977 | France . |
| 2652955 | 10/1990 | France . |
| 3346595 A | 7/1985 | Germany . |

*Primary Examiner*—Steven L. Stephan
*Assistant Examiner*—Elvin G. Enad
*Attorney, Agent, or Firm*—McCormick, Paulding & Huber

[57] ABSTRACT

Deformation absorbing grooves 16a are recessedly provided on the inner surfaces of both side walls 15a of a main body 15 of a brush holder made of resin in the sliding direction of a brush 44, and brush holding surface portions 16b holding both end edge portions of the outer surfaces of the brush are formed at edge portions of the grooves 16a on the inner surfaces of the side walls 15a. A pair of first reinforcing ribs 16c are projectingly provided at closing end sides of cutaway portions 18 and 19 on the outer surfaces of the both side walls 15a in the sliding direction of the brush, a pair of second reinforcing ribs 16d are projectingly provided at both top sides of the outer surface of a top side wall 15d for closing an end surface across the tops of the both side walls in the sliding direction of the brush, and an end portion 46a on the reaction side of a torsion spring 46 is engaged with an engageable portion 21A projectingly provided on the first reinforcing rib 16c.

10 Claims, 9 Drawing Sheets

BRUSH HOLDER DEVICE AND METHOD OF MOLDING SAME

BACKGROUND OF THE INVENTION

1. Field of the Invention

This invention relates to a brush holder device, in which brush holders and a brush holder stay are made of resin, more particularly to a technique of preventing sliding performance of brushes in the brush holders made of resin from being lowered, and further to a technique of insert-molding terminal members in the brush holder stay made of resin, and for example, to a brush holder device effective in use for a car mounted motor.

2. Related Art Statement

As one of brush holder devices for the conventional car mounted motors, there is a brush holder device, in which a plurality of brush holders are integrally projectingly provided at intervals in the circumferential direction on an end surface of a brush holder stay made of resin and formed to provide an annular shape, and a cutaway portion for a torsion spring and a cutaway portion for pulling out a pigtail are opened in a pair of opposing side walls in the brush holder made of resin, respectively.

Furthermore, there is a brush holder device, in which a plurality of terminal members are electrically insulated from one another and insert-molded in the brush holder stay, and pigtail connecting terminals each formed at one end portions of the terminal members are provided for every brush holders, respectively, while, plug terminals each formed at the other portions of the terminal members are each provided at positions spaced apart from the pigtail connecting terminals.

In the above-described method of molding the brush holder device, when the terminal members are insert-molded in the brush holder stay, in order to prevent the terminal members from being deformed by resin to be filled up under pressure in a cavity of a molding tool, the front surface portions and the rear surface portions of the terminal members are held by holding pins which are inserted into the cavity of the molding tool.

However, the inventor of the present invention has made clear that, in the brush holder device having the brush holders made of resin, depending on the type of a resin material to be used, when heat is applied to the brush holders, a pair of opposing side walls of the brush holder are curved and deformed such that center portions of the side walls in the direction of height are contracted inwardly. If such a deformation takes place, then such a state is brought about that the brush is clamped from both sides by the both side walls of the brush holder, so that sliding performance of the brush with respect to the brush holder is lowered. Furthermore, the inventor of the present invention has made clear that, when the heat is applied, then the forward side portion of a top side wall is deflectingly deformed downward so as to close opening sides of the both cutaway portions. If such a deformation takes place, then such a state is brought about that the brush is pressed in the vertical direction, so that the sliding performance of the brush with respect to the brush holder is lowered.

Furthermore, in the brush holder device molded by the above-described method of molding, after the holding pins are released from the molding, holes is being the traces of the holding pins are opened in the brush holder stay, whereby parts of the terminal members are exposed at the bottoms of the holding pin trace holes, short-circuit troubles are caused, to thereby possibly lower the service life of the motor.

That is, brush wear powder produced due to the operation of the motor is scattered in the motor, intrudes into the stay holding pin trace holes on the brush holder stay and is accumulated gradually. When the brush wear powder is accumulated over the whole inner peripheral surfaces of the holding pin trace holes, the brush wear powder in the holding pin trace holes comes into contact with the brush wear powder accumulated on the outer surface of the brush holder stay. If the brush wear powder accumulated on the outer surface of the brush holder stay is brought into a state of being in the electrical contact with conductive members different in the polarity such as pigtails wired to here, then the conductive members different in the polarity are brought into a state of being electrically short-circuited to the terminal members through the brush wear powder. In short, there is a possibility of that the service life of the motor is defined by a period of time, during which the whole inner peripheral surfaces of the holding pin trace holes are buried up by the brush wear powder.

SUMMARY OF THE INVENTION

It is an object of the present invention to provide a brush holder device for preventing sliding performance of brushes from being lowered due to the thermal deformation.

It is another object of the present invention to provide a brush holder device for improving the service life of a motor and a method of molding the same.

The brush holder device according to the present invention is characterized in that deformation absorbing grooves are recessedly provided in the sliding direction of the brush on the inner surfaces of a pair of opposing side walls in a main body of the brush holder made of resin for slidably holding the brush, and brush holding surface portions in the slidable contact with both end side portions on the outer peripheral surfaces of the brush are molded at edge portions of the grooves molded on the inner surfaces. In this case, both side walls may have cutaway portions for pulling out a pigtail of the brush, and the deformation absorbing grooves may be provided in areas in association with the cutaway portions.

Furthermore, another brush holder device according to the present invention is characterized in that reinforcing ribs are projectingly provided on the outer surfaces of a pair of side walls, in both of which cutaway portions are each opened from one end to the other end.

As these reinforcing ribs, there are a pair of first reinforcing ribs projectingly provided, respectively, so as to extend in the vertical direction intersecting the sliding direction of the brush at the end edges on the opposite side of the opening ends of the cutaway portions on the outer surfaces of the both side walls.

A spring receiving portion for receiving one end portion of a torsion spring for pressing the brush may be provided on the first reinforcing rib. In this case, the engageable portion may be projectingly provided at an end portion on the side of the closing side wall of the first reinforcing rib integrally formed on the first reinforcing rib.

As other reinforcing ribs, there are a pair of second reinforcing ribs projectingly provided, respectively, so as to extend in the sliding direction of the brush at both end edges of the outer surface of a side wall for closing an end surface across the tops of the both side walls.

According to the above-described brush holder device of the present invention, since the deformation absorbing grooves are recessedly provided, respectively, on the inner surfaces of the both side walls of the brush holder, even if the side wall is deformed to contract inwardly in the radial directions due to the heat, the bottoms of the deformation absorbing grooves are not brought into contact with the both side surfaces of the brush, whereby the brush is not clamped, so that such a phenomenon that sliding performance of the brush with respect to the brush holder is lowered by the clamping does not take place.

Furthermore, according to the above-described other brush holder device of the present invention, since the reinforcing ribs are projectingly provided on the outer surfaces of the both side walls and the closing side wall of the brush holder, so that the forward end portion of the closing wall of the brush holder can be prevented from being deflectingly deformed inwardly. This deformation is prevented, so that the sliding performance of the brush with respect to the brush holder can be prevented from lowering.

Especially, the first reinforcing ribs improve the rigidity of the edge portions on the opposite side of the opening ends of the cutaway portions of the side walls, in which the cutaway portions are opened, so that the side walls can be prevented from being deformed for closing the openings of the cutaway portions.

Further, when the end portion of the torsion spring on the reaction side is engaged with the engageable portion provided on the first reinforcing rib, the resilient force of the torsion spring on the reaction side is brought into a state of acting on the first reinforcing rib to be pressed in the circumferential direction of the brush holders, the first reinforcing rib is brought into a state of very effectively receiving the resilient force of the torsion spring at the end portion on the reaction side.

Furthermore, the second reinforcing ribs improve the rigidity of the whole closing wall in the sliding direction of the brush, so that the closing wall itself can be prevented from being deflectingly deformed.

On the other hand, a further brush holder device according to the present invention is characterized in that, in a brush holder device wherein a plurality of terminal members are electrically insulated from one another and insert-molded in a brush holder stay made of resin and formed to provide an annular shape, holding pin trace holes which have held the terminal members at the time of insertion are opened in projected portions projectingly provided at end surface of the brush holders in the brush holder stay. In this case, the projections may be pigtail holding projections for holding pigtails of the brushes received in the brush holder or pigtail connecting terminal holding projections for holding the pigtail connecting terminals.

According to a still further brush holder device of the present invention, since the holding pin trace holes are opened in the projected portions projectingly provided on the end surfaces of the brush holders in the brush holder stay, creeping distances from the outer surfaces of the terminal members exposed at the bottoms of the holding pin trace holes to opening edges of the holding pin trace holes being opened at the tops of the projections are lengthened. Accordingly, a period of time, during which the whole inner peripheral surfaces of the holding pin trace holes are buried up by the brush wear powder being produced due to the operation of the motor is lengthened very much, so that a possibility of causing the short-circuit may be eliminated.

Furthermore, a method of molding the brush holder device of this invention is characterized in that, preparing a molding tool comprising a first mold, in which a cavity for molding one end surface on the side of the brush holder of the brush holder stay is recessedly provided; a second mold, in which a cavity for molding the other end surface of the brush holder stay is recessedly provided; and a plurality of holding pins to be inserted into the cavities of the first mold and the second mold; wherein a holding pin provided in the cavity of the first mold is provided at a position for molding a projection projectingly provided at an end surface on the side of the brush holder of the brush holder stay; and the terminal members are disposed in a cavity formed between the first mold and the second mold and supported as being made to be floated from the inner surface of the cavity by the holding pins, subsequently, the cavity is filled up with resin, and thereafter, the first mold, the second mold and the holding pins are released in directions of being separated from one another, whereby the brush holder stay is molded.

The above-described and other objects, and novel feature of the present invention will become apparent more fully from the description of the following specification in conjunction with the accompanying drawings.

BRIEF DESCRIPTION OF THE DRAWINGS

FIG. 2 is a partially omitted disassembled oblique view showing one embodiment of the brush holder device according to the present invention.

DESCRIPTION OF THE PREFERRED EMBODIMENTS

Figure 1A:
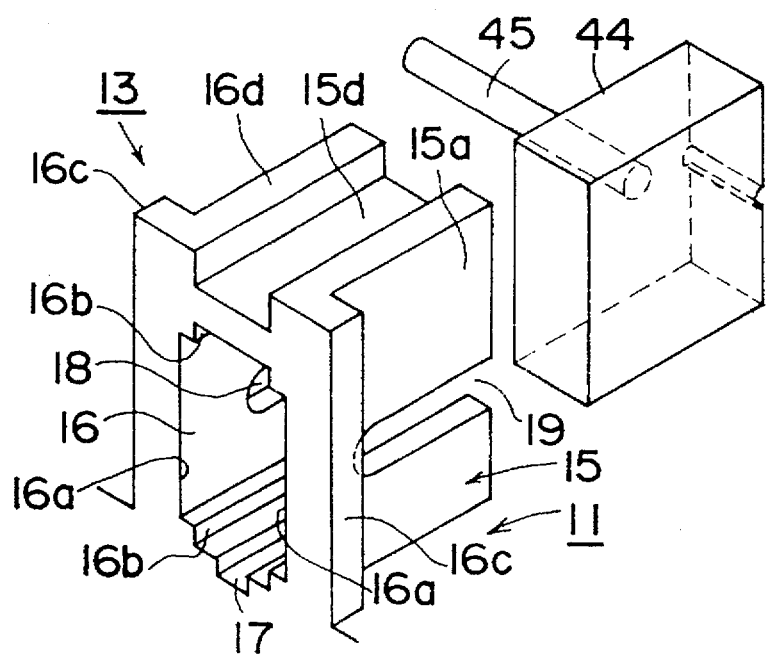
FIG. 1(a) is a disassembled oblique view showing essential portions of one embodiment of the brush holder device according to the present invention, FIGS. 1(b), 1(c), 1(d), 1(e) and 1(f) being respective front sectional views and respective side sectional views for explaining actions.
Figure 1B:
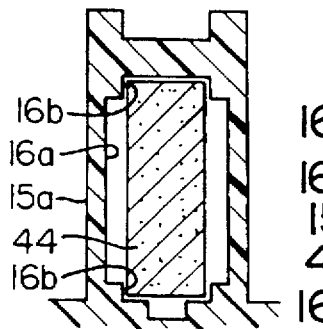
Figure 3:
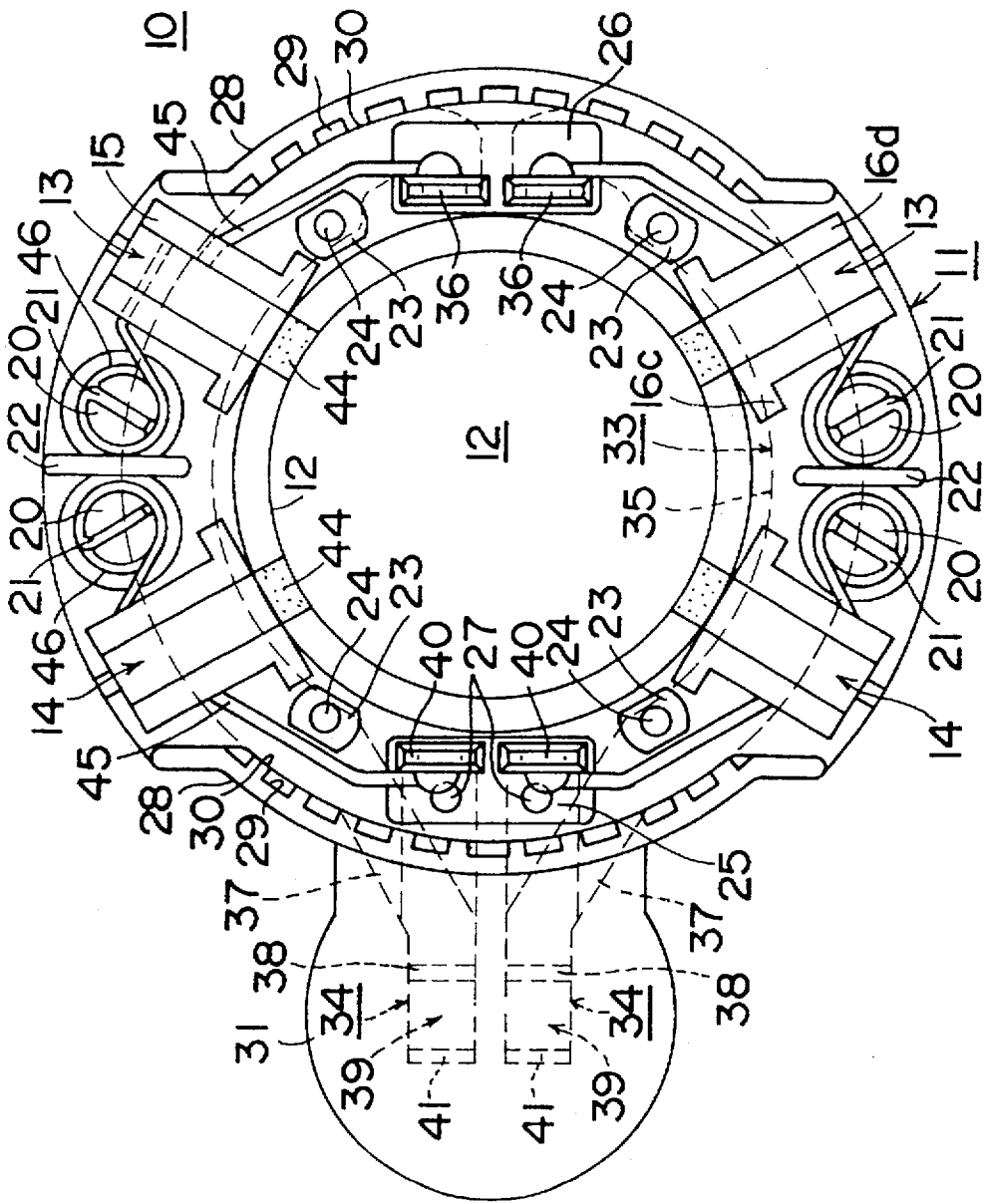
FIG. 3 is a plan view of the brush holder device shown in FIG. 2.
Figure 4:
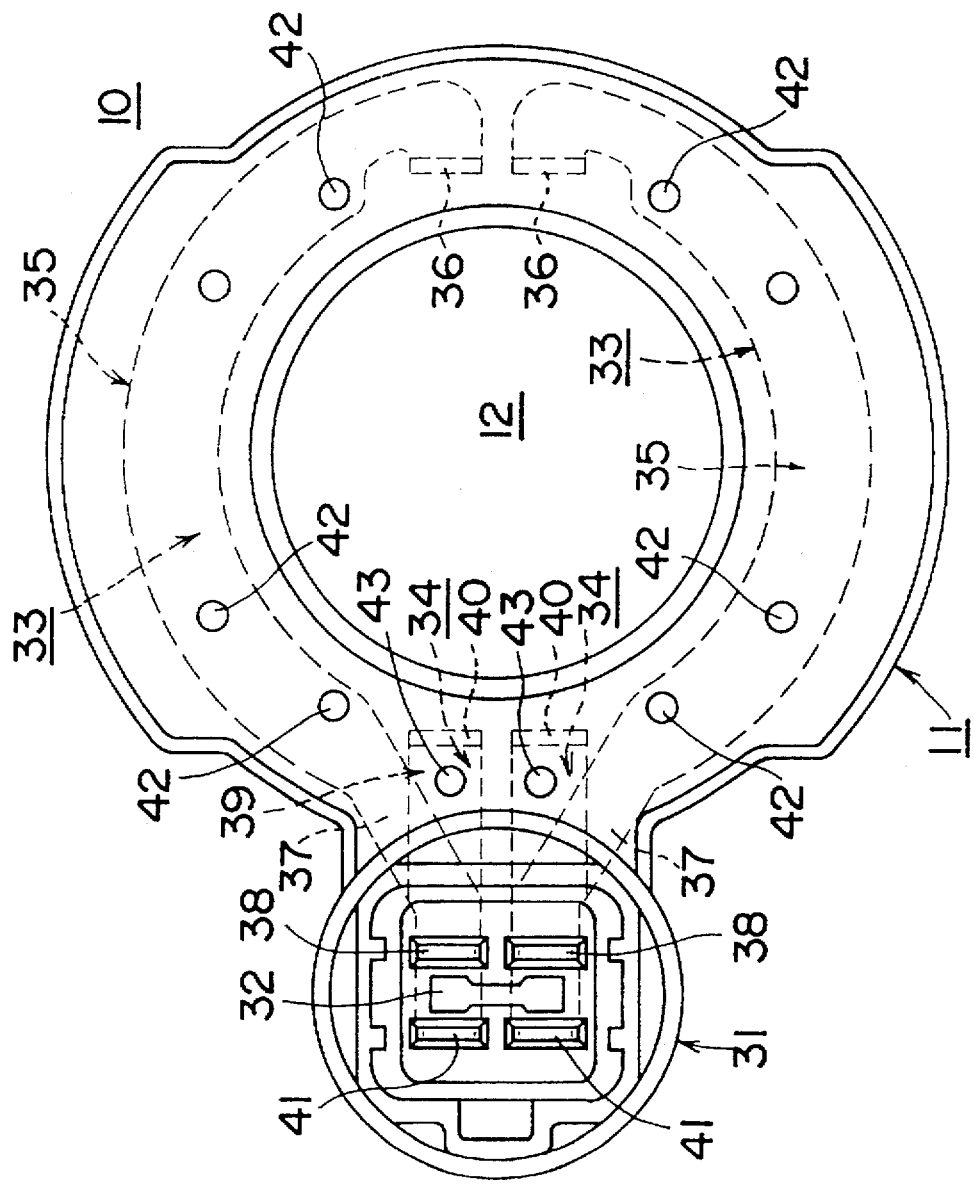
FIG. 4 is a bottom view of the brush holder device shown in FIG. 2.
Figure 5:
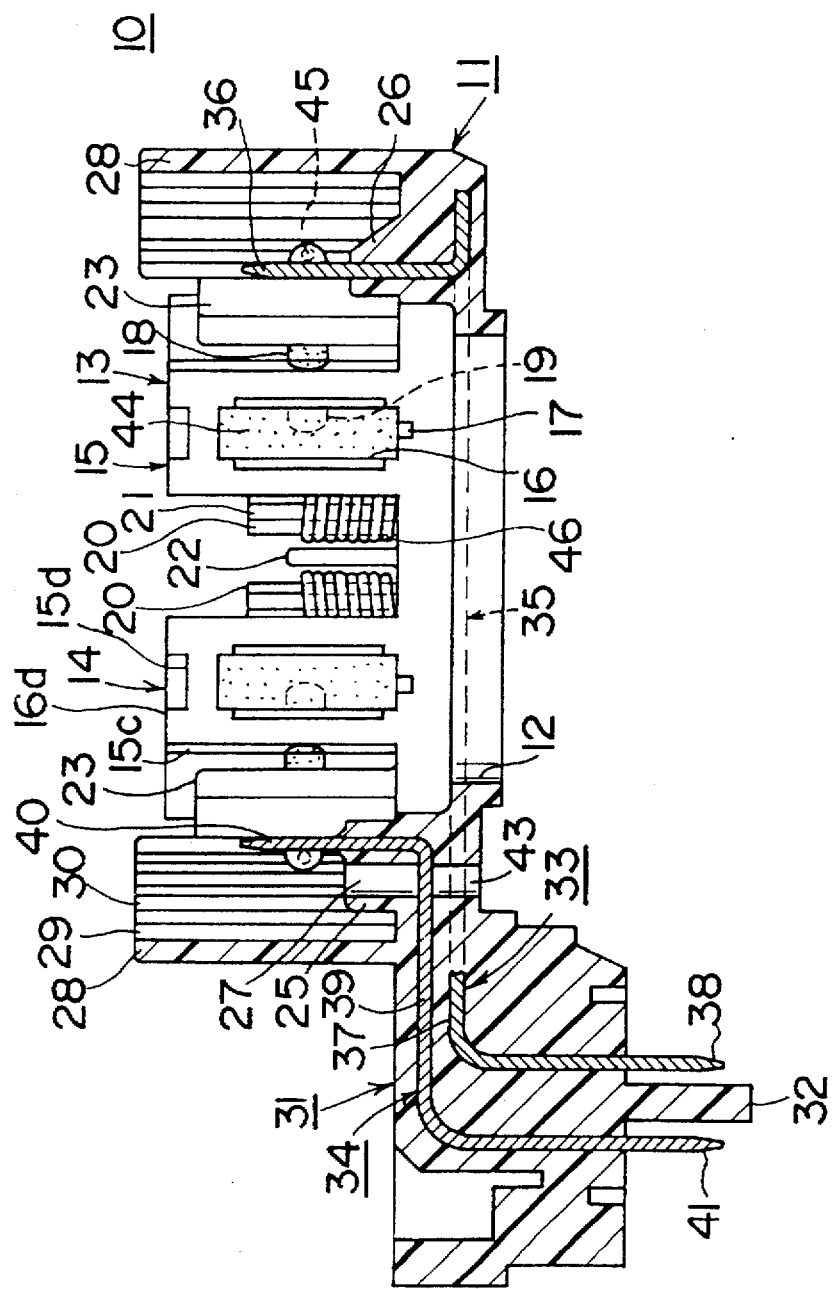
FIG. 5 is a side sectional view of the brush holder device shown in FIG. 2.
Figure 6:
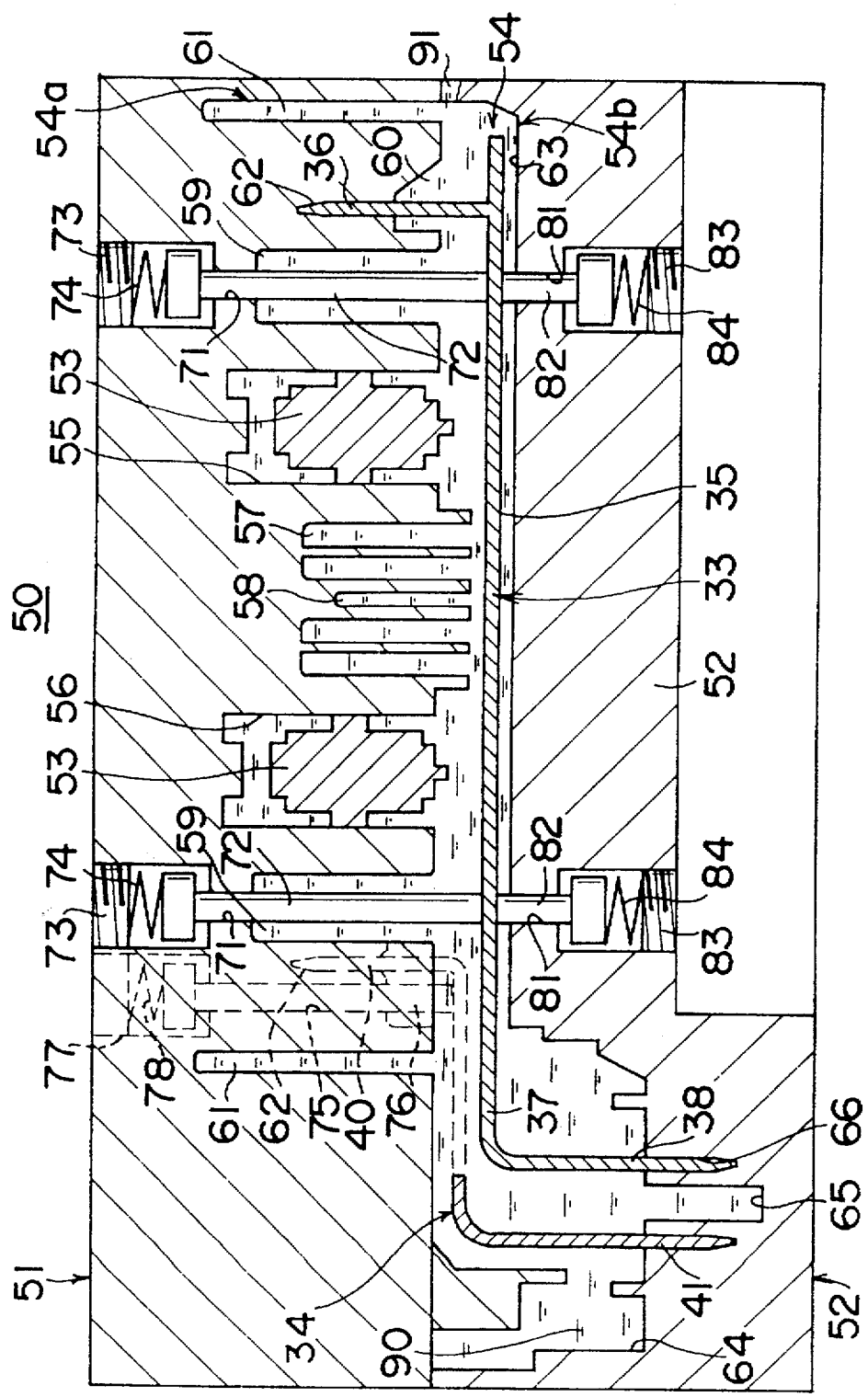
FIG. 6 is an exploded side sectional view showing essential portions of a molding tool for use in a method of molding the brush holder device according to the present invention.
Figure 7:
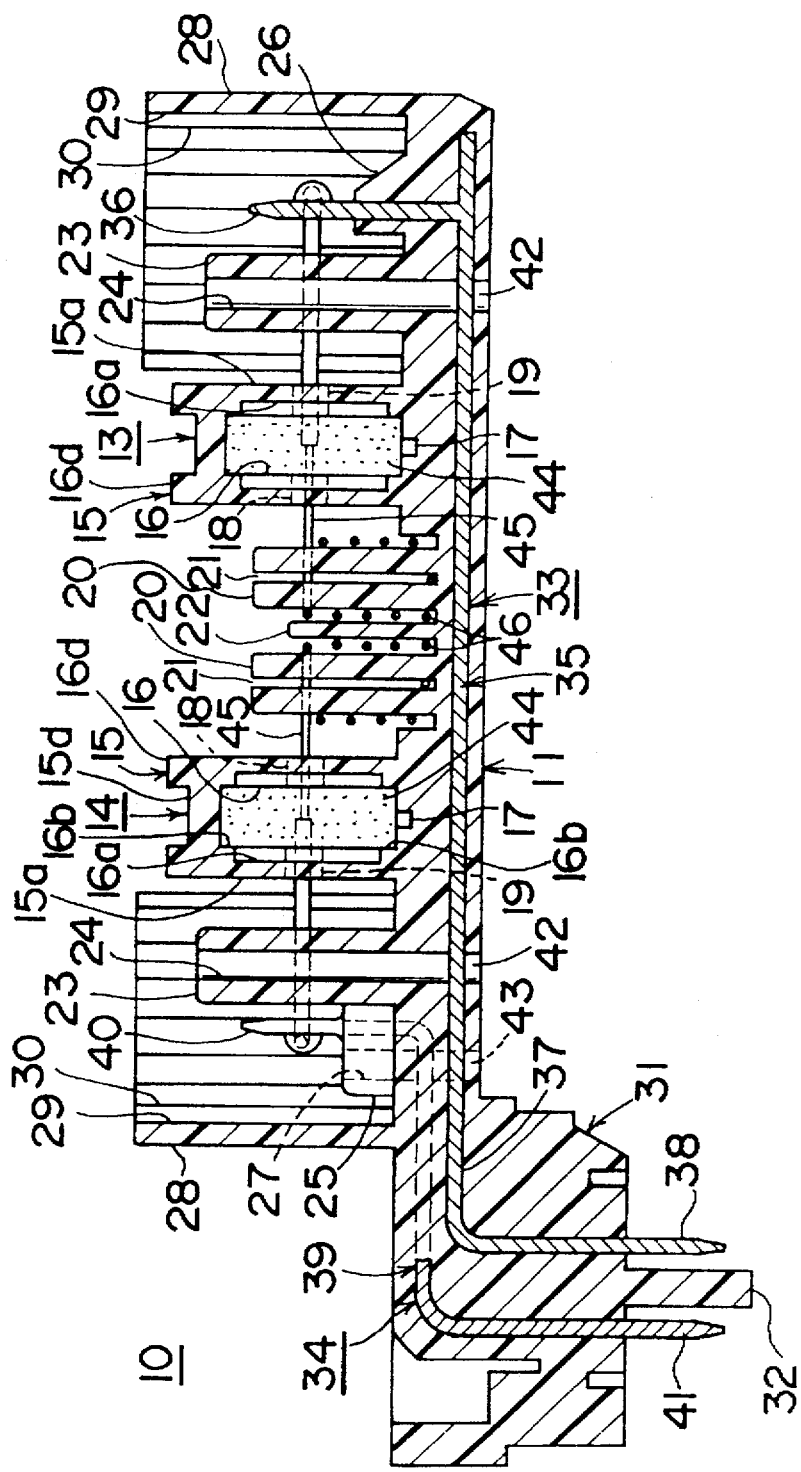
FIG. 7 is an exploded side sectional view showing essential portions of one embodiment of the brush holder device according to the present invention.

FIG. 1(a) is the disassembled oblique view showing the essential portions of one embodiment of the brush holder device according to the present invention, FIGS. 1(b), 1(c), 1(d), 1(e) and 1(f) being the respective front sectional views and the respective side sectional views for explaining the actions. FIG. 2 is the partially omitted disassembled oblique view showing the brush holder device, FIG. 3 is the plan view thereof, FIG. 4 is the bottom view and FIG. 5 is the side sectional view thereof. FIG. 6 is the exploded side sectional view showing the essential portions of the molding tool for use in the method of molding the brush holder device according to the present invention. FIG. 7 is the exploded side sectional view showing the essential portions of one embodiment of the brush holder device according to the present invention.

In this embodiment, the brush holder device according to the present invention is arranged for use in a car mounted motor and constructed to be a type of a brush holder device 10, in which terminal members are insert-molded in a brush holder stay made of resin. This brush holder device 10 has a brush holder stay 11 (hereinafter referred to as a "stay") made of resin and formed to provide a substantially disk shape. The outer shape of the stay 11 is molded in association with the inner shape of a motor housing, not shown, and a commutator insertion hole 12 is largely opened in a circular shape at the central portion of the stay 11.

On one end surface (hereinafter referred to as an "upper surface") of the stay 11, there are integrally projectingly provided two sets of pairs respectively constituted by a plus side brush holder 13 and a minus side brush holder 14 in the axial direction such that the plus side brush holders 13 and the minus side brush holders 14 are opposed to each other with the center line of the commutator insertion hole 12 being interposed therebetween. The both plus side brush holders 13, 13 and the both minus side brush holders 14, 14 are formed to provide the same shapes and arranged symmetrically with respect to the center line of the commutator insertion hole 12, so that, henceforth, the arrangement of these members is typically explained by use of one of the plus side brush holder 13 (hereinafter referred to as the "brush holder" except for the case where distinction is needed).

The brush holder 13 has a main body 15 formed to provide a rectangular tubular shape, and the main body 15 is arranged on the stay 11 in such a manner that the center of the tubular shape of it coincides with the normal line of the commutator insertion hole 12 and erected at a right angle in such a manner that the rectangular shape is disposed longitudinally. A brush receiving portion 16 is defined by the inner tubular shape of the main body 15, and this brush receiving portion (chamber) 16 is formed to provide a size, in which the brush to be described hereunder can be slidably coupled thereinto and held in the direction of the center of the tubular shape (hereinafter referred to as an "inner-outer direction") and opposite end faces in the inner-outer direction are opened. At the bottom surface of the brush receiving chamber 16 of the main body 15, there is recessedly provided a brush cooling groove 17 for preventing the temperature of the brush from rising at predetermined width and depth in a manner to extend in the inner-outer direction. Furthermore, on the both side walls of the main body 15, there are integrally opened a cutaway portion 18 for a torsion spring and a cutaway portion 19 for pulling out a pigtail in a manner to extend in the inner-outer direction, and the respective cutaway portions 18 and 19 are each opened in a half slot shape and the outer side ends are opened, respectively, at the outer side ends of the side walls.

On the inner surfaces of the pair of side walls 15a and 15a, in which the both cutaway portions 18 and 19 of the main body 15 of the brush holder are opened, respectively, there are recessedly provided a pair of deformation absorbing grooves 16a and 16a in a manner to extend in the inner-outer direction, i.e., the sliding direction of the brush, and, at both top and bottom end portions of the aforesaid inner surfaces, there are formed brush holding surface portions 16b and 16b faced to each other. That is, the deformation absorbing grooves 16a are formed at the predetermined width and depth over the full length of the inner-outer direction and opened, respectively, at the both inner and outer end surfaces of the main body 15, and the height of the deformation absorbing grooves 16a in the vertical direction is set at a value smaller than the height of the brush receiving chamber 16 and the deformation absorbing grooves 16a and 16a are arranged symmetrically in the vertical direction with the brush holding surface portions 16b and 16b having predetermined sizes being left at the top and bottom end portions of the inner surfaces of the side walls of the brush receiving chamber 16.

At the inner end edge portions on the outer surfaces of the pair of side walls 15a and 15a, in which the both cutaway portions 18 and 19 of the main body 15 of the brush holder are opened, a pair of first reinforcing ribs 16c are arranged in a manner to extend in the vertical direction and projectingly provided, respectively, outwardly to the right and left in the lateral direction of the brush receiving chamber 16 (The circumferential direction of the brush holder stay 11. Hereinafter referred to as the "lateral direction"). Widths (axial lengths) in the inner-outer direction of the first reinforcing ribs 16c are definite and set at a value possibly larger within a range of not interfering with the both cutaway portions 18 and 19, and the sizes (thickness in the lateral direction) of the first reinforcing ribs 16c from the outer surfaces of the side walls 15a to the forward ends of the first reinforcing ribs 16c are set at a value possibly larger within a range not interfering with a pigtail holding projection to be described hereunder.

Furthermore, at the right and left end edge portions on the outer surface of a top side wall 15d of the main body 15 of the brush holder, a pair of second reinforcing ribs 16d are arranged in a manner to extend in the inner-outer direction and projectingly provided upwardly. Heights and widths in the lateral direction of the second reinforcing ribs 16d are definite and the ribs 16d are formed to provide rod shapes each being of a substantially regular square in section, and the widths thereof in the lateral direction are set at values substantially equal to the thickness of the side walls 15a.

Four spring holding columns 20 in total having the same columnar shapes are projectingly provided at right angles, respectively, at the sides of four brush holders 13, 13 and 14, 14 on the top surface of the stay 11, and engageable portions 21 for engaging one ends of torsion springs are formed in the respective spring holding columns 20 in vertically split groove shapes. Out of the four spring holding columns 20 in total, respective two spring holding columns 20 are arranged between adjoining plus side brush holder 13 and minus side brush holder 14 in a manner to be adjacent to each other, and, between the adjoining spring holding columns 20 and 20, there is projectingly provided at a right angle on the top surface of the stay 11 a flat plate-shaped partition wall 22 for partitioning and electrically insulating the spring holding columns 20 from each other.

Furthermore, at the other sides of the brush holders 13, 13 and 14, 14 on the top surface of the stay 11, there are projectingly provided at right angles four pigtail holding projections 23 for regulating free moves of the pigtails, and the pigtail holding projections 23 are each formed to provide a similar shape having an oval section, in which one side of the column which is directed outwardly and the other side of the coles which is directed inwardly are formed with flat faces. Through the pigtail holding projections 23, there are opened holding pin trace holes 24 in the axial direction, and these holding pin trace holes 24 extend through insertion areas of plus side terminal members to be described hereunder and reach the surfaces of the plus side terminal members.

Then, out of the totally four pigtail holding projections 23, respective two pigtail holding projections 23 are disposed adjacently to each other between the adjoining plus side brush holders 13 and between the adjoining minus side brush holders 14, and, between the adjoining pigtail holding projections 23 and 23, there are projectingly provided on the top surface of the stay 11, respectively, pigtail connecting terminal holding projections (hereinafter referred to as the "terminal holding projections") 25 (being of a square pole shape longer in the lateral direction) and 26 (being of a triangle pole shape) for holding pigtail connecting terminals. Through the both terminal holding projections 25 and 26, there are projectingly provided upwardly from the interior of the stay 11 the pigtail connecting terminals of the minus side terminal member and the plus side terminal member, respectively, which will be described hereunder. Furthermore, through the square pole-shaped terminal holding projection 25 in the axial direction, there are opened a pair of holding pin trace holes 27 disposed adjacently to each other, and the respective holding pin trace holes 27 extend through the insertion areas of the minus side terminal members to be described hereunder and reach the surface of the minus side terminal members.

On the outer periphery of the stay 11, there are projectingly provided at right angles on the top surface of the stay 11 a pair of insulating walls 28 in such a manner that the outer sides of the portions in which the respective two pigtail holding projections 23 are arranged, are surrounded, and lengths in the axial direction (heights) of the insulating walls 28 are definite and lengths in the circumferential direction (widths) are set at values to substantially cover the intervals formed between the adjoining plus side brush holders 13 and minus side brush holders 14. Furthermore, on the inner peripheral surfaces of the insulating walls 28, there are formed a multitude of recesses 29 and projections 30 in a manner to be arranged alternately in the circumferential direction and extend in parallel to each other in the axial direction.

At a position outer than the square pole-shaped terminal holding projection 25 on the outer periphery of the stay 11, there is downward projectingly provided at a right angle a substantially columnar coupler portion 31, and, at the central portion of the bottom surface of the coupler portion 31, there is projectingly provided at a right angle a rectangular plate-shaped partition wall 32. Then, in the stay 11 and the coupler portion 31, two pairs of plus side terminal members 33 and minus side terminal members 34 are arranged symmetrically with each other, interposing the center line of the commutator insertion hole 12, and insert-molded in association with two pairs of plus side brush holders 13 and minus side brush holders 14.

The two plus side terminal members 33 and 33 are formed in symmetry with each other and arranged symmetrically with respect to the center line of the commutator insertion hole 12, respectively. That is, the plus side terminal member 33 has a main body 35 made of a copper material (copper or an alloy of copper) and is formed to provide a substantially circularly arcuate plate by press. This main body 35 has an inner diameter larger than an inner diameter of the commutator insertion hole 12 and has an outer diameter smaller than an outer diameter of the stay 11, and is buried in a ring-shaped portion of the stay 11 concentrically with the stay 11. A pigtail connecting terminal 36 is bent at a right angle and integrally formed at one end portion of the main body 35, and this pigtail connecting terminal 36 is projected from within the triangle pole-shaped terminal holding projection 26 through the top surface outwardly. A rectilinear shaped portion 37 is integrally connected to the other end portion of the main body 35, a plug terminal 38 is bent at a right angle in a direction opposite to the bending direction of the pigtail connecting terminal 36 and integrally formed at an end portion opposite to the connecting side of the rectilinear shaped portion 37, and this plug terminal 38 is projected from within the coupler portion 31 through the bottom surface outwardly.

The other two minus side terminal members 34 and 34 each have a main body 39 made of a copper material (copper or an alloy of copper) and formed to provide a substantially rectangle by press. A pigtail connecting terminal 40 is bent at a right angle and integrally formed at one end portion of this main body 39, and this pigtail connecting terminal 40 is projected from within the square pole-shaped terminal holding projection 25 disposed at a position close to the coupler portion 31 through the top surface thereof outwardly. A plug terminal 41 is bent at a right angle in a direction opposite to the bending direction of the pigtail connecting terminal 40 and integrally formed at the other end portion of the main body 39, and this plug terminal 41 is projected from within the coupler portion 31 through the bottom surface outwardly. In the coupler portion 31, the plug terminals 38 of the respective plus side terminal members 33 and the plug terminals 41 of the respective minus side terminal members 34 are disposed in a square-shaped corner portion and partitioned by the partition wall 32.

In the bottom surface of the stay 11, there are opened a plurality of holding pin trace holes 42 for holding the plus side terminal members 33 at a plurality of positions opposed to the plus side terminal members 33 at intervals in the circumferential direction, and these holding pin trace holes 42 extend through the stay 11 and reach the bottom surfaces of the plus side terminal members 33. Furthermore, at positions close to the pigtail connecting terminals 40 and 40 of the both minus side terminal members 34 and 34 in the bottom surface of the stay 11, there are arranged and opened, respectively, holding pin trace holes 43 and 43 for holding the minus side terminal members 34 and 34, which extend through the stay 11 and reach the bottom surfaces of the minus side terminal members 34 and 34.

The brush holder device having the above-described construction will be integrally molded by use of resin under pressure by the method of molding as will be described hereunder. By the description of the following method of molding, the detailed construction of the above-described brush holder device will become apparent more fully.

A molding tool 50 shown in FIG. 6 is used for molding the above-described brush holder device 10. The molding tool 50 includes an upper mold 51 as a first mold, a lower mold 52 as a second mold and a core 53 as a third mold, and, at a mating surface between the upper mold 51 and the lower mold 52, there is formed a cavity 54 by an upper mold cavity recess 54a and a lower mold cavity recess 54b. In the upper mold cavity recess 54a, there are formed: a plus side brush holder main body molding portion 55; a minus side brush holder main body molding portion 56; a spring holding column molding portion 57 for molding a spring holding column 20 and an engageable portion 21; a partition wall portion molding portion 58; pigtail holding projection molding portions 59; pigtail connecting terminal holding projection molding portions 60; and insulating wall molding portions 61, respectively. Furthermore, in the pigtail connecting terminal holding projection molding portion 60 of the upper mold cavity recess 54a, there are recessedly provided pigtail connecting terminal holding holes 62.

In the lower mold cavity recess 54b, there are formed: a stay main body molding portion 63 for molding a ring-shaped main body in the stay 11; a coupler portion molding portion 64; and a partition wall molding portion 65, respectively, and, at the bottom surface of the coupler portion molding portion 64, there are recessedly provided four plug terminal holding holes 66. The core 53 is provided at a position in association with the plus side brush holder main body molding portion 55 and the minus side brush holder main body molding portion 56 of the upper mold 51, respectively, formed in a manner to linearly move to and from these molding portions, and is capable of molding the brush receiving portion 16 in cooperation with these molding portions 55 and 56. Furthermore, the core 53 is constructed for molding a brush cooling groove 17, a cutaway portion 18 for a torsion spring, a cutaway portion 19 for pulling out a pigtail, deformation absorbing grooves 16a, brush holding surface portions 16b, first reinforcing ribs 16c and second reinforcing ribs 16d, in the brush receiving portion 16, respectively.

At positions (four in total) opposed to the respective pigtail holding projection molding portions 59 of the upper mold 51, there are opened respective holding pin supporting holes 71 in the vertical direction so as to extend through the molding portions 59, and respective holding pins 72 are coupled into these supporting holes 71 and supported slidably in the vertical direction. Set-screw members 73 are screwed to the top portions of the respective holding pin supporting holes 71, and compression springs 74 are mounted in the respective supporting holes 71 so as to take reaction from the set-screw members 73 and energize the holding pins 72 downward at all times.

Furthermore, at positions of the upper mold 51, which are opposed to a pigtail connecting terminal holding projection molding portion 60 at the other side, there are opened two adjoining holding pin supporting holes 75 so as to extend through the molding portion 60 in the vertical direction, and respective holding pins 76 are coupled into the supporting holes 75 and supported slidably in the vertical direction. Set-screw members 77 are screwed in the top portions of the respective holding pin supporting holes 75, and compression springs 78 in the respective supporting holes 75 take reaction from the set-screw members 77 and energize the holding pins 76 downward at all times.

In the other lower mold 52, there are opened in the vertical direction a plurality of holding pin supporting holes 81 (in an example of illustration, 10 in total) so as to extend through a stay main body molding portion 63 a predetermined positions spaced apart from one another in the circumferential direction, and respective holding pins 82 are coupled into these supporting holes 81 and supported slidably in the vertical direction. Set-screw members 83 are screwed in the bottom portions of the respective holding pin supporting holes 81, and, in the respective supporting holes 81, there are mounted compression springs 84 so as to take reaction from the set-screw member 83 and energize the holding pins 82 upwardly at all times. Out of these holding pins 82, four of them are opposed to the respective holding pins 72 in association with the pigtail holding projection molding portions 59 of the upper mold 51, respectively, and the remaining two of them are opposed to the two holding pins 76 in association with the pigtail connecting terminal holding projection molding portions 60 of the upper mold 51.

Incidentally, at a suitable position in the mating surface of the lower mold 52, there is opened a gate 91 for pouring liquid resin (hereinafter referred to as "resin") as a molding material into the cavity 54 so as to be communicated with the cavity 54.

The method of molding the brush holder device by the molding tool having the above-described construction will hereunder be described.

In the lower mold cavity recess 54b of the lower mold 52, there are disposed two plus side terminal members 33 and two minus side terminal members 34, respectively. In this case, the plug terminal 38 of the plus side terminal member 33 and the plug terminal 41 of the minus side terminal member 34 are coupled into the respective plug terminal holding holes 66, positioned and held, respectively, and the bottom surfaces of the respective terminal members 33 and 34 are supported from under by the respective holding pins 82.

Subsequently, mold joining is made between the lower mold 52 and the upper mold 51, which are clamped by a cylinder device. Due to the mold joining, the pigtail connecting terminal 36 of the plus side terminal member 33 and the pigtail connecting terminal 40 of the minus side terminal member 34 are coupled into the respective pigtail connecting terminal holding holes 62, positioned and held, respectively, and the top surfaces of the respective terminal members 33 and 34 are supported from above by the respective holding pins 72 and 76.

Subsequently, mold joining is made between the core 53 and the upper mold 51, which are clamped by the cylinder device. Due to this mold joining, the core 53 is brought into a state of being inserted into the plus side brush holder main body molding portion 55 and the minus side brush holder main body molding portion 56 of the upper mold 51.

Thereafter, the resin 90 is poured through the gate 91 into the cavity 54 constituted by the upper mold 51, the lower mold 52 and the core 53 and the cavity 54 is filled up with the resin. When the resin 90 is poured into and the cavity 54 is filled up with the resin, the pressing force of the resin 90 is applied to the respective terminal members 33 and 34. In this case, the long plus side terminal member 33 is easily deflectingly deformed by the pressing force of the resin 90 in the direction of thickness. However, in this embodiment, the long plus side terminal member 33 is uniformly held over the whole length thereof by the group of the holding pins 72 and 82 in the vertical direction, so that, even if the long plus side terminal member 33 is pressed by the resin 90, the plus side terminal member 33 is not deflectingly deformed.

After the resin 90 used for filling up is solidified, the core 53 is removed from the upper mold 51 by the cylinder device, subsequently, the lower mold 52 is removed from the upper mold 51 by the cylinder device, and the brush holder device 10 having the above-described construction is released as a molding. At the same time, the respective holding pins 72, 76 and 82 are released. When the respective holding pins 72, 76 and 82 are released, such a state is brought about that, in the brush holder device 10 as the molding, there are opened the respective holding pin trace holes 24, 27, 42 and 43, respectively.

The method of assembling the motor and the action by the brush holder device 10 having the above-described construction will hereunder be described.

Each one brush 44 is received in the brush receiving portion 16 of the brush holder, respectively, and the pigtail 45 connected to the brush 44 is inserted through the cutaway portion 19 for pulling out a pigtail, which is opened in the brush holder main body 15, whereby wiring is made through a space formed between the respective pigtail holding projection 23 and the insulating wall 28. Subsequently, the forward end portions of the respective pigtails 45 are welded and connected to the pigtail connecting terminals 36 and 40. Furthermore, the torsion springs 46 as the brush springs are externally mounted on the spring holding columns 20 and ends of the torsion springs 46 are engaged with the engageable portions 21. The brush holder device 10 is mounted on a motor housing, not shown, thereafter, when a commutator, not shown, of a rotor of the motor is inserted into the commutator insertion hole 12 of the stay 11, the respective brushes 44 are pressed and contacted against the commutator by the resiliency of the torsion springs 46.

After the motor which has been assembled as described above is mounted on a motor car or the like, a female coupler, not shown, which is a counterpart of the coupler portion 31 is mounted to the coupler portion 31 of the brush holder device 10, and, when electric power is supplied from a power source to the respective plug terminals 38 and 41 of the coupler portion 31, in this embodiment, power is supplied to the commutator through the respective terminal members 33 and 34 by two systems of the plus side brush holders 13, 13 and the minus side brush holders 14, 14. Accordingly, even if one of the conductive systems is out of order, the operation of the motor is secured by the other of the conductive systems, so that the operation of the motor can be reliably guaranteed.

Figure 1C:
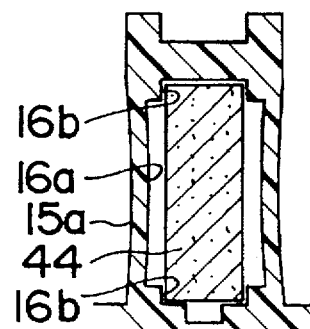
Figure 1D:
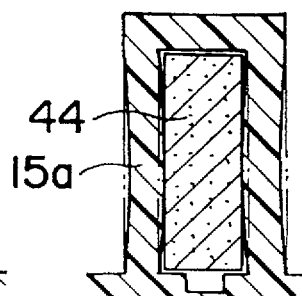

Now, it has been made clear by the inventor of the present invention that, when heat caused by friction and contact resistance between the brushes 44 and the commutator due to the operation of the motor and heat caused by the heating of an engine and the like are applied, depending on the resin material to be used, as shown in FIG. 1(d), the central portions of the both side walls 15a and 15a in the direction of height are contracted inwardly and deflectingly deformed. If deformation occurs as described above, then such a state is brought about that the brush 44 is clamped from the both side surfaces by the both side walls 15a and 15a of the main body 15 of the brush holder, whereby sliding performance of the brush 44 with respect to the brush receiving chamber 16 is lowered. However, in this embodiment, the deformation absorbing grooves 16a and 16a are recessedly provided, respectively, on the inner surfaces of the both side walls 15a and 15a of the main body 15 of the brush holder, whereby, even if the deformation is caused, the sliding performance of the brush 44 with respect to the brush receiving chamber 16 is not lowered. That is, even if the deformation is caused to the side walls 15a and 15a, as shown in FIG. 1(c), the bottoms of the deformation absorbing grooves 16a and 16a are not brought into contact with the both side surfaces of the brush 44, so that the brush 44 is not clamped.

Figure 1E:
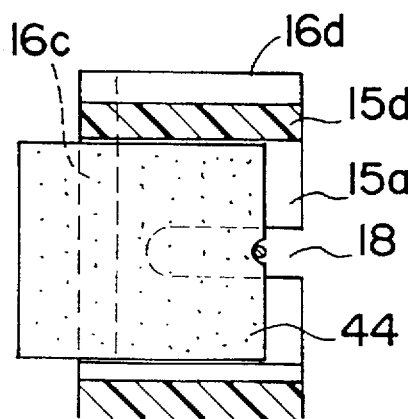
Figure 1F:
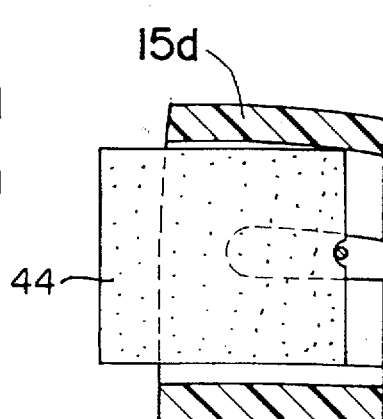
Figure 1B:
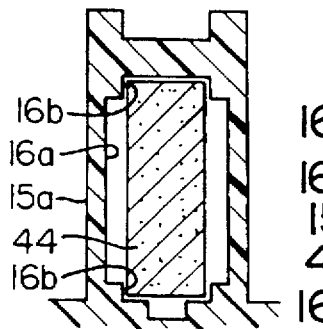
Figure 1C:
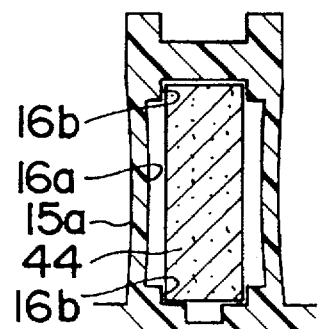
Figure 1D:
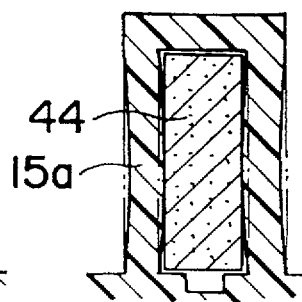
Figure 1E:
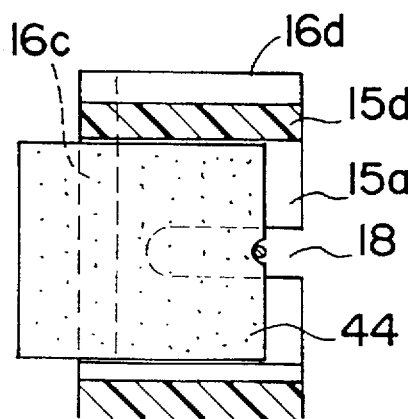
Figure 1F:
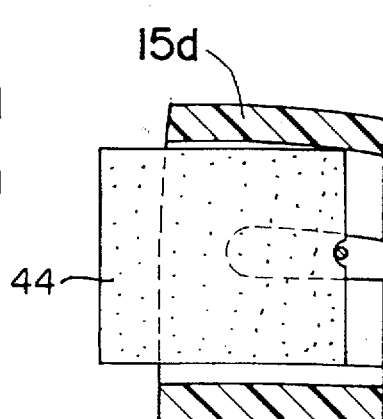

Furthermore, it has been made clear by the inventor of the present invention that, when heat is applied to the brush holder, as shown in FIG. 1(f), the top side wall 15d of the main body 15 of the brush holder is deflectingly deformed downward so as to close the opening sides of the both cutaway portions 18 and 19. If the deformation is caused as described above, then such a state is brought about that the brush 44 is pressed in the vertical direction, so that the sliding performance of the brush 44 with respect to the brush receiving chamber 16 is lowered. However, in this embodiment, as shown in FIG. 1(e), the first reinforcing ribs 16c and the second reinforcing ribs 16d are projectingly provided on the outer surfaces of the main body 15 of the brush holder, inwardly deflecting deformation at the forward end portion of the top side wall 15d of the main body 15 of the brush holder can be avoided in advance. The deformation is avoided in advance, so that the sliding performance of the brush 44 with respect to the brush receiving chamber 16 can be prevented from being lowered. Here, the first reinforcing ribs 16c improve the rigidity of the end edge portions opposite to the opening ends of the cutaway portions 18 and 19 of the side walls 15a, in which the cutaway portions 18 and 19 are opened, so that the side walls 15a are prevented from being deformed to close the openings of the cutaway portions. Furthermore, the second reinforcing ribs 16d improve the rigidity of the whole of the top side wall 15d in the inner-outer direction, so that the top side wall 15d itself is prevented from being deflectingly deformed downward.

Now, the wear powder of the brush 44 which is polished due to the rotation of the commutator scatters around and is gradually accumulated on the top surface of the stay 11. In this embodiment, since four brushes 44 are polished by the commutator, it is estimated that the accumulating speed of the brush wear powder is faster than that of the normal motor. Then, the brush wear powder being accumulated on the top surface of the stay 11 intrudes into the holding pin trace holes 24 and 27, which are opened on the top surface of the stay 11, and, when the brush wear powder, not shown, adheres and is accumulated on the whole inner peripheral surfaces of the holding pin trace holes 24 and 27, the brush wear powder in the holding pin trace holes 24 and 27 comes into contact with the brush wear powder which has fallen down on the surface of the brush holder stay 11. If the brush wear powder which has fallen down on the surface of this brush holder stay 11 is in a state of being in electrical contact with the pigtail 45 as being an example of a conductive member different in polarity, which is wired thereto, then this pigtail 45 and the plus side terminal member 33 or the minus side terminal member 34 are in a state of being electrically short-circuited through the brush wear powder. That is, the service life of the motor is to be defined by a period of time, during which the whole inner peripheral surfaces of the holding pin trace holes 24 and 27 are buried up by the brush wear powder.

However, in this embodiment, the holding pin trace holes 24 and 27 are opened, respectively, in the pigtail holding projection 23 and the terminal holding projection 25, which are projectingly provided on the end faces of the brush holder, whereby the distances (creeping distances) between the surfaces of the plus side terminal member 33 and the minus side terminal member 34, which are exposed at the bottoms of the respective holding pin trace holes 24 and 27 to the opening ends of the respective holding pin trace holes 24 and 27, which are opened at the tops of the respective projections 23 and 25 become long, so that the period of time, during which the whole inner peripheral surfaces of the respective holding pin trace holes 24 and 27 are buried up by the brush wear powder produced due to the operation of the motor, become very long and a possibility of generating the short-circuit thereby can be satisfactorily avoided within the range of the service life of the motor.

By the way, in this embodiment, the insulating walls 28 are projectingly provided on the outer periphery of the stay 11, so that the respective pigtails 45 can be prevented from coming into contact with the housing of the motor. Furthermore, a multitude of recesses 29 and projections 30 are alternately formed on the inner peripheral surfaces of the insulating walls 28, whereby the period of time, during which the whole inner peripheral surfaces of the insulating walls 28 are buried up by the brush wear powder can be lengthened, thus resulting in that, a phenomenon, in which the brush holder device and the motor housing are short-circuited by the brush wear powder can be prevented from occurring.

Figure 8A:
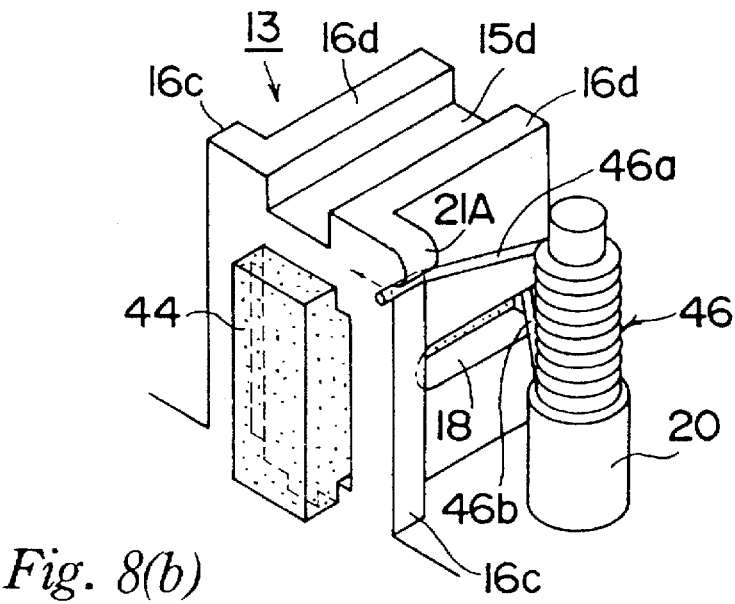
FIG. 8 shows essential portions of another embodiment of the brush holder device according to the present invention, FIG. 8(a) being an oblique view and FIGS. 8(b) and 8(c) being explanatory views for explaining the actions.
Figure 8B:
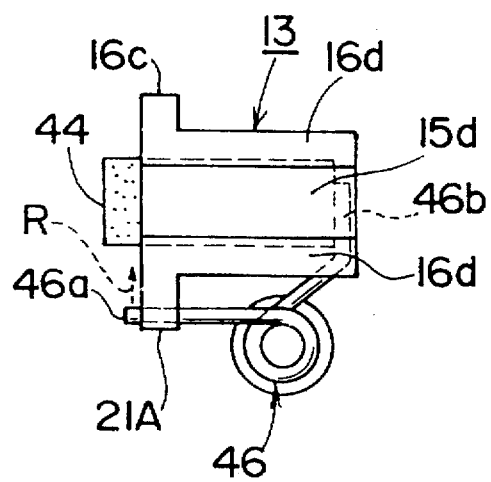
Figure 8C:
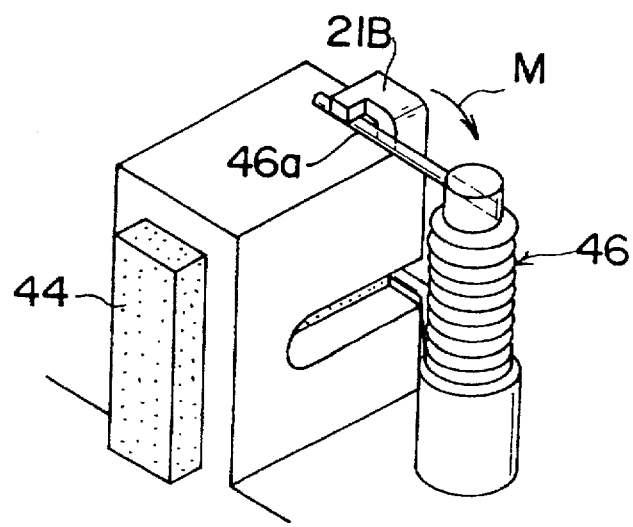

FIG. 8 shows the essential portions of another embodiment of the brush holder device according to the present invention, FIG. 8(a) being an oblique view, FIGS. 8(b) and 8(c) being the explanatory views for explaining the actions.

The difference of this embodiment 2 from the above-described embodiment 1 resides in that, out of the pair of first reinforcing ribs 16c and 16c in the brush holder 13, an engageable portion 21A for engaging an end portion 46a on the reaction side of the torsion spring 46 is integrally projected from the first reinforcing rib 16c positioned at the side of the cutaway portion 18 for a torsion spring 46, and the end portion 46a on the reaction side of the torsion spring 46 externally mounted on the spring holding column 20 is engaged with this engageable portion 21A in such a manner that the resilient force acts in the direction of thickness (lateral direction) while the end portion 46a on the reaction side is prevented from being moved freely in the vertical direction and disengaged. That is, the substantially semicircular projection-shaped engageable portion 21A is integrally projectingly provided on the top end portion of the side surface on the side of the cutaway portion 18 for the torsion spring of the first reinforcing rib 16c in the lateral direction outwardly, the end portion 46a on the reaction side of the torsion spring 46 is engaged with a corner portion at the lower side of the semicircular shape of this engageable portion 21A from below. An end portion 46b on the action side of the torsion spring 46 whose end portion 46a on the reaction side is engaged with the engageable portion 21A is engaged with the surface on the outer side of the brush 44 at the opening end of the cutaway portion 18 for the torsion spring in the same manner as in the above-described embodiment 1.

In energizing the brush 44 with a resilient force, the end portion 46a on the reaction side of the torsion spring 46 energizes the engageable portion 21A with a resilient force R indicated by an arrow in FIG. 8(b). This resilient force R acts as a force for bringing down the brush holder 13 in the lateral direction. However, the first reinforcing ribs 16c and 16c which are projectingly provided on the right and left side surfaces of the brush holder 13 have thickness in the lateral direction, whereby a very high strength in the construction of rigidity is displayed against this force for bringing down in the lateral direction, so that the brush holder 13 is not deformed in the lateral direction. Accordingly, a state, in which the brush 44 coupled into the brush holder 13 causes the sliding failure, can be avoided in advance. Furthermore, it becomes unnecessary to provide the engageable portion for receiving the end portion 46a on the reaction side of the torsion spring 46, so that the spring holding column 20 may be formed to provide a mere columnar shape, thus resulting in that the spring holding column 20 can be improved in the strength.

Now, as shown in FIG. 8(c), an engageable portion 21B is projectingly provided at a rear end portion on the top side wall of the brush holder, and, when the end portion 46a on the reaction side of the torsion spring 46 is engaged, a moment force M acts for tending to close the opening end portions of the cutaway portion 18 for the torsion spring, so that there is a possible danger of causing the sliding failure of the brush 44. In this embodiment 2, the moment force M as described above does not act, so that the sliding failure of the brush 44 cannot take place.

Incidentally, one brush holder 13 has been described for convenience in the above description, however, it is needless to say that the same is true of other brush holders 13 and 14.

Incidentally, the present invention should not necessarily be limited to the above-described embodiments, however, it is needless to say that the present invention can be modified variously within the scope not departing from the gist.

For example, the brush holder made of resin should not necessarily be integrally molded on the stay, and the brush holder may be molded separately of the stay and assembled to the stay. Furthermore, such as a brush holder, in which the cutaway portions are not opened in the both side walls may be adopted and, depending on the case, only one construction out of the constructions of the deformation absorbing grooves and the reinforcing ribs may be adopted.

Further, the deformation absorbing grooves should not necessarily be provided over the total lengths in the inner-outer direction of the brush holder, and the deformation absorbing grooves may be provided only in the areas in association with the cutaway portions opened in the both side walls. When the provisions of the deformation absorbing grooves is made as described above, the portions other than the deformation absorbing grooves on the both side walls become thicker relatively, the same effect as the first reinforcing ribs is displayed, so that the deflecting deformation of the top side wall downward can be controlled.

In addition, as the projections for lengthening the creeping distances of the holding pin trace holes, the pigtail holding projection and the terminal holding projection should not necessarily be utilized, and, other projections such as the spring holding columns may be utilized and projection for the specialized purpose may be provided.

As has been described hereinabove, according to the present invention, the deformation absorbing grooves are recessedly provided on the inner surfaces of the both side walls of the brush holder, respectively, whereby, even if deformations may take place on the side walls, the bottoms of the deformation absorbing grooves do not come into contact with the both side surfaces of the brush, whereby the brush is not clamped so that the sliding performance of the brush with respect to the brush holder is not lowered.

Furthermore, according to the present invention, the reinforcing ribs are projectingly provided on the outer surfaces of the brush holder, whereby the closing side wall of the brush holder can be previously prevented from being deflectingly deformed inwardly, so that the sliding performance of the brush with respect to the brush holder can be prevented from lowering.

Further, according to the present invention, the holding pin trace holes for holding the terminal members are opened in the projections molded in the brush holder stay, whereby the period of time, during which the whole inner peripheral surfaces of the respective holding pin trace holes are buried up by the brush wear powder produced due to the operation of the motor becomes very long, so that a possibility of causing the short-circuit thereby can be prevented within the range of the service life of the motor.

Detailed description has hereinabove been given of the invention achieved by the inventor of the present invention with reference to the embodiment. However, the present invention should not be limited to the embodiments described above, and may be variously modified within the scope not departing from the gist.

What is claimed is:

1. A brush holder device wherein at least a pair of first and second opposing vertical side walls horizontally spaced from one another and having inner surfaces and a third horizontal side wall providing a horizontal end surface extending between the tops of said first and second side walls are integrally molded by use of resin and are carts of a main body of a tubular brush holder slidably holding a brush having a rectangular cross-section and upper and lower portions, characterized in that deformation absorbing grooves each with upper and lower side edges are recessedly provided, respectively, in the inner surfaces of said first and second vertical side walls without passing completely through the associated one of said first and second side walls, and in that each of said inner surfaces of said first and second vertical side walls has two brush holding surface portions located respectively adjacent said upper and lower edges of the associated one of said grooves, which upper and lower brush holding surface portions slidably contact said brush along said upper and lower portions of said brush.

2. A brush holder device as set forth in claim 1, wherein both of said first and second side walls have cutaway portions for accommodating a pigtail of the brush, and said deformation absorbing grooves of said first and second side walls are provided in areas of said first and second side walls including said cutaway portions.

3. A brush holder device wherein at least a pair of first and second opposing vertical side walls are horizontally spaced from one another with each of said first and second walls having an inner and an outer surface and a third horizontal side wall extending between the tops of said first and second vertical side walls and having an inner surface and an outer surface are integrally molded by use of resin and are part of a main body of a tubular brush holder holding a brush for movement in a sliding direction and which brush slidably engages at least portions of said inner surfaces of said first and second vertical side walls and of said third horizontal side wall, and a cutaway portion is formed in each of said first and second side walls and extends through the associated ones of said first and second side walls from the inner surface thereof to the outer surface thereof, characterized in that reinforcing ribs are provided on the outer surfaces of said side walls, and in that said ribs project outwardly from said outer surfaces of said side walls.

4. A brush holder device as set forth in claim 3, wherein said tubular brush holder has an inner end and an outer end, each of said cutaway portions opens at said outer end of said brush holder and extends inwardly toward said inner end of said brush holder to a location short of said inner end of brush holder so as to have an inner end at said location, said reinforcing ribs are a pair of reinforcing ribs projectingly provided on said outer surfaces of said first and second walls in the space between said inner end of said brush holder and said inner ends of said cutaway portions and so as to extend vertically in the direction intersecting the sliding direction of said brush.

5. A brush holder device as set forth in claim 3, wherein said reinforcing ribs are a pair of reinforcing ribs projectingly provided on the outer surface of said third side wall so as to extend horizontally in the sliding direction of said brush, said ribs being spaced from one another and aligned with said first and second side walls.

6. A brush holder device as set forth in claim 4, wherein an engageable portion for engaging an end portion on the reaction side of a torsion spring for biasing said brush is formed in one of said first reinforcing ribs.

7. A brush holder device as set forth in claim 6, wherein said engageable portion is projectingly and integrally formed on said one of said first reinforcing ribs at the level of said third side wall.

8. A brush holder device wherein: a plurality of brush holders are provided at intervals in the circumferential direction on a brush holder stay made of resin molded to provide an annular shape, said stay having an upper side including said brush holders and a lower side; a plurality of terminal members each having a radially inner end portion and a radially outer end portion are electrically insulated from one another and insert-molded in said brush holder stay; pigtail connecting terminals formed at the inner end portions of the terminal members are provided respectively for each of the brush holders; and plug terminals are formed at the outer end portions of the terminal members; characterized in that trace holes for temporarily receiving holding pins for holding said terminal members at the time of insertion are formed in projections projectingly provided on said upper side of said brush holder.

9. A brush holder device as set forth in claim 8, wherein said projections in which said trace holes are formed are pigtail holding projections for holding pigtails of the brushes received in said brush holders.

10. A brush holder device as set forth in claim 8, wherein said projection in which said trace holes are formed are pigtail connecting terminal holding projections for holding said pigtail connecting terminals.

* * * * *